United States Patent [19]

Zupancic et al.

[11] Patent Number: 4,708,981

[45] Date of Patent: Nov. 24, 1987

[54] WATER INSOLUBLE PROTON CONDUCTING POLYMERS

[75] Inventors: Joseph J. Zupancic, Bensenville; Raymond J. Swedo, Mt. Prospect; Sandra Petty-Weeks, Naperville, all of Ill.

[73] Assignee: UOP Inc., Des Plaines, Ill.

[21] Appl. No.: 807,727

[22] Filed: Dec. 11, 1985

[51] Int. Cl.$^4$ ............... C08L 29/04; C08L 33/02; C08L 41/00; C08L 43/02

[52] U.S. Cl. ................................. 525/59; 524/417; 524/422; 525/57; 525/279; 525/291; 525/296; 525/301; 525/404; 525/412; 525/417; 525/502; 525/903

[58] Field of Search ............... 525/57, 903, 58, 59, 525/301, 296, 279, 291, 417, 404, 412, 502; 524/414, 417, 422

[56] References Cited

U.S. PATENT DOCUMENTS 4,071,454 1/1978 Yamamoto et al. ............ 210/321 A
4,264,676 4/1981 Uzumaki et al. .................. 428/8
4,396,476 8/1983 Roemer et al. ................. 525/903
4,469,499 8/1984 Siegfried et al. ............... 525/903

*Primary Examiner*—Allan M. Lieberman
*Attorney, Agent, or Firm*—Thomas K. McBride; John F. Spears, Jr.; Raymond H. Nelson

[57] ABSTRACT

Water-insoluble proton-conducting polymers which may be formed into membranes which are used in gas separation or gas sensing processes comprise an interpenetrating polymer network. This IPN is formed from the interaction between a host polymer and a guest polymer which is subsequently cross-linked or cured. The host polymer blend is formed from a phosphoric acid or sulfuric acid and a polymer or copolymer of a compound which possesses repeat units such as, for example, hydroxy ethylene, vinyl sulfonic acid, ethylene imine, etc, while the guest polymer is formed from a monofunctional monomer such as methacrylic acid and a difunctional cross-linking agent such as methylenebisacrylamide.

27 Claims, No Drawings

WATER INSOLUBLE PROTON CONDUCTING POLYMERS

BACKGROUND OF THE INVENTION

The membranes which are employed for these purposes usually comprise various organic polymers or mixtures of organic polymers either alone or supported on a porous backing material. For example, semipermeable membranes which are used in desalination processes can comprise cellulose acetate polymers, thin film composite membranes comprising polymeric compounds such as polyethyleneimine, epiamine, polyvinylamine films composited on a porous support such as a polysulfone membrane, etc. Likewise, gaseous separation membranes may comprise polymeric membranes of cellulose nitrate, cellulose acetate, polydimethylsilicone, polystyrene, and poly(4-methyl-1-pentene), as well as thin film membranes such as polydimethylsilicone, polystyrene, polymethylpentene polymers composited on a porous support such as polysulfone, polyphenylene oxide, etc.

Some prior patents have shown certain polymeric compositions which are useable in various processes. For example, U.S. Pat. No. 4,071,454 discloses a hollow fiber which is useful for dialysis. However, a dialysis membrane which comprises a plurality of poly(vinyl alcohol) fibers is substantially different from the polymer blends of the present invention in which the latter may be used for a gas-separation. The fiber membranes which have been disclosed in this patent cannot and will not separate a gas inasmuch as they are utilized to physically absorb a whole molecule, that is, the undissociated molecule in the polymer, and subsequently moving said whole molecule through the polymer under the influence of an osmotic pressure gradient. In this respect, the polymer membrane is very similar in nature to a desalination membrane. In like manner, U.S. Pat. No. 4,264,676 discloses superfine fibers of the poly(vinyl alcohol) type which are prepared by baking these superfine fibers in the presence of a dehydration catalyst which may comprise ammonium polyphosphate, phosphoric acid, ammonium phosphate salts and hydrogen chloride to yield a polyenized poly(vinyl alcohol) [PVA] containing polyene structural units and vinyl alcohol units of varying ratios. This polyenized PVA can be chemically modified with sulfuric acid to yield a strongly acidic cation-exchange possessing crosslinked sulfate, sulfonic acid and sulfuric ester radicals. Further, the polyenized PVA can be chemically modified via Diels-Alder's reaction with maleic anhydride or acrylic acid to yield a weakly acidic cation-exchange fiber. Alternatively, the polyenized PVA can be chemically modified with epichlorohydrine, followed by amination with trimethylamine to yield a strongly basic anion-exchange fiber.

A thin film polymeric membrane may be used in a gas-separation process. The polymeric material will transport an ion such as a proton through the membrane in a charge transport reaction. In order to ultimately transport a molecule of hydrogen from one side of this membrane to the other, two protons must be formed. The protons are formed by dissociation of molecular hydrogen on a suitable electrode, the protons migrate through the polymeric medium and the corresponding electrons through an external circuit. The transported protons and electrons are then recombined, on a suitable catalyst, on the membrane's opposing surface to form molecular hydrogen. The membranes and fibers which were taught in the two previously mentioned patents do not dissociate the molecule or salt, but merely provide a means of transporting the nondissociated molecules through the membrane or ion-exchanging the salts within the fiber, respectively.

The membrane of the present invention is formed from an interpenetrating polymer network which is stable to moisture and therefore may be used as a hydrogen sensor. Interpenetrating Polymer Networks (IPN) may be prepared from two polymers, that is, a host and a guest polymer. There are usually three general classes of IPN's:

1. Sequential
2. Simultaneous
3. Latex

All three of these IPN's are similar in nature but differ only in the method of preparing the product. In the sequential type of IPN's, the host polymer is prepared in the absence of the second monomer. Following the preparation of the host polymer, it is then treated with the second monomer in the presence of a compatible solvent. Following the removal of the solvent the second monomer is then polymerized to yield the resulting guest polymer and the resultant IPN. The new polymer network is more than just a blending of the host polymer and guest polymer; it is the generation of a new polymeric system which possesses properties which are a combination of the host and guest polymer. In a system of this type, the host and guest polymer show only a physical interaction between the two polymers, there being no chemical or covalent bonding of the two polymer chains. This physical interaction between the two polymers in the IPN means that the polymer chains become permanently entangled with one another and therefore, it is impossible to leach or dissolve one polymer away from the other polymer.

In a majority of cases which are found in prior operations, an admixture of an organic compound, especially in a polymeric state, with an inorganic compound, results in a phase separation due to the fact that the two systems are immiscible in nature. However, we have now discovered that an IPN may be fabricated by admixing an inorganic compound such as a phosphoric acid or sulfuric acid with an organic polymer to form host polymers and thereafter subjecting this host polymer to further admixture with a guest polymer formed from a monofunctional monomer and a difunctional cross-linking agent. It was thoroughly unexpected that a thin film membrane could be cast from the IPNs to provide a membrane which would be highly conductive to protons and therefore find a use in separations which involve the generation of a proton as in the case of hydrogen.

BRIEF SUMMARY OF THE INVENTION

This invention relates to novel composition of matter which may be used as gas-separation or hydrogen sensor membranes. More specifically, the invention is concerned with novel water-insoluble proton-conducting polymers. A conventional operation for separating certain gases from a gas stream containing a mixture of gases whereby a desired gas may be separated and recovered involves the use of membranes which possess a high permeability to the molecular form of the desired gas such as oxygen, hydrogen, nitrogen, etc. These membranes, especially in the case of hydrogen, possess a high permeability to hydrogen whereby molecular hydrogen is transported from the high pressure side of the device, through the membrane and emerges as molecular hydrogen on the low pressure side. Alternatively, separation of gases may be attained by dissociating the desired gas on the high pressure side and transporting it as an ion through the membrane followed by recombining the ions on the low pressure side. Therefore, a desirable membrane for hydrogen separation should possess excellent protonic conductivity properties. As will hereinafter be shown in greater detail, we have now discovered that membranes which contain both organic and inorganic components will possess this desired property and therefore may be used as hydrogen sensors, hydrogen separation devices, as well as a solid state thin film electrolyte.

It is therefore an object of this invention to provide novel polymeric membranes which are useful in gas-separation or gas sensing, where the reaction involves a proton, devices.

A further object of this invention is to provide a method for preparing organic-inorganic membranes of a type hereinafter set forth in greater detail, said membranes being utilized in gas-separation devices.

In one aspect, an embodiment of this invention resides in a water-insoluble proton-conducting membrane which consists of an interpenetrating polymer network comprising a mixture of a host polymer formed from phosphoric acids or sulfuric acid and a polymer or copolymer of a compound which possesses repeat units selected from the group consisting of hydroxy ethylene poly(vinyl alcohol), ethyleneimine, acrylic acid, methacrylic acid, N-vinylimidazole, ethylene oxide, acrylamide, N-substituted acrylamides, 4-vinylpyridine, 2-vinylpyridine, vinyl sulfonic acid, 2-ethyl-2-oxazoline and phenol formaldehyde resins, and a guest polymer formed from a monofunctional monomer selected from the group consisting of acrylic acid, methacrylic acid, acrylamide, methacrylamide, 2-acrylamido-2-methyl-propanesulfonic acid, N-benzylacrylamide, N-ethylmethacrylamide, N-phenyl-acrylamide and N-phenylmethacrylamide and a difunctional cross-linking agent selected from the group consisting of methylenebisacrylamide, N,N-diallylacrylamide, m-xylenebisacrylamide, and N,N'-trimethylenebisacrylamide.

A further embodiment is found in a process for the preparation of a water-insoluble proton-conducting membrane which consists of admixing a solution of a blend of phosphoric acid and a host polymer which possesses repeat units selected from the group consisting of hydroxy ethylene, ethyleneimine, acrylic acid, methacrylic acid, N-vinylimidazole, ethylene oxide, acrylamide, N-substituted acrylamides, 4-vinylpyridine, 2-vinylpyridine, vinyl sulfonic acid, 2-ethyl-2-oxazoline and phenol formaldehyde resins, with a solution of a guest polymer formed from a monofunctional monomer selected from the group consisting of acrylic acid, methacrylic acid, acrylamide, methacrylamide, 2-acrylamido-2-methylpropane-sulfonic acid, N-benzylacrylamide, N-ethylmethacrylamide, N-phenylacrylamide and N-phenylmethacrylamide and a difunctional cross-linking agent selected from the group consisting of methylenebisacrylamide, N,N-diallylacrylamide, m-xylenebisacrylamide and N,N'-trimethylenebisacrylamide at admixing conditions to form an interpenetrating polymer network, casting the admixture on a casting surface, removing the solvent, curing the resultant membrane, and recovering the resultant water-insoluble proton-conducting interpenetrating polymer network membrane.

A specific embodiment of this invention is found in a membrane which comprises an interpenetrating polymer network comprising a host polymer consisting of poly(vinyl alcohol), orthophosphoric acid, and a guest polymer consisting of poly(methacrylic acid-methylenebisacrylamide).

Another specific embodiment of this invention is found in a process for the preparation of a water-insoluble proton-conducting membrane which consists in admixing a solution of poly(vinyl alcohol) and phosphoric acid with a solution of a guest monomer formed from methacrylic acid and methylenebisacrylamide at a temperature in the range of from about ambient to about 50° C. and a pressure in the range of from about ambient to about 200 pounds per square inch to form an interpenetrating polymer network, casting the admixture on a casting surface, removing the solvent which comprises water, curing the resultant membrane to form the resultant water-insoluble proton-conducting interpenetrating polymer network membrane.

Other objects and embodiments will be formed in the following further detailed description of the present invention.

DETAILED DESCRIPTION OF THE INVENTION

As hereinbefore set forth, the present invention is concerned with membranes prepared from water-insoluble proton-conducting polymers which comprise a homogeneous thin film of an interpenetrating polymer network as well as to a method for the preparation thereof. In a gas-separation or hydrogen sensor membrane, one of the key components of the membrane is the polymer matrix. In prior membranes, a restriction on the use of the membranes as a sensor was that the sample atmosphere possessed low humidity inasmuch as the polymer component of the membrane was water-soluble. Therefore, the presence of water vapor in the gas stream would be detrimental to the stability and mechanical properties of the sensor. In view of this, it is apparent that a beneficial characteristic of a polymer matrix is that it be resistant to the action of water which may be present in the gas stream which is to be separated or which is to be subjected to a sensing process. In order to prepare a sensor which is stable to water, it is therefore necessary that the polymer matrix which is employed to form the membrane be water-insoluble in nature. In order to prepare such a membrane there are a number of alternatives open to effect the desired result. For example, one way in which to prepare a system which is insensitive to the presence of water is to chemically modify an existing system; or secondly, to select a new polymer which is water-insoluble; or thirdly, to prepare a water-insoluble polymer which also possesses the ability to conduct protons and particularly the interpenetrating polymer networks which are the basis for the present invention. The first two alternatives hereinbefore presented possess certain detrimental properties. For example, in chemically modifying an existing system it is possible that the gross modification or derivatization of the polymer can result in a detrimental effect to the per-formance of the membrane or it is possible that the modified polymer exhibit an instability with respect to the chemical components of the membrane. Likewise, the second alternative also can be beset with two problems: for example, gross changes in the polymer matrix can be also detrimental to the performance, and secondly, when utilizing an inorganic component such as phosphoric acid it is possible that the insolubility of the acid in organic solvents can result in the production of a poor membrane. As you will hereinafter be shown in greater detail, the third alternative presented, that is, the preparation of an IPN which will form the desired membrane, offers a viable approach inasmuch as it will permit the use of sensor polymers with no chemical modification in the IPN as the host polymer.

The polymer matrix from which the desired water-insoluble proton-conducting membrane may be prepared comprises an interpenetrating polymer network which is formed from the interaction of a host polymer and a guest polymer.

This polymeric network will form flexible and mechanically stable films which may be used as a membrane. A feature which distinguishes an IPN from similar blends of two or more polymers is the fact that at least one of the polymer components of IPN is cross-linked to itself or to like components, but not to the other polymer or polymers. This unique cross-linking which is inherent to an interpenetrating polymer network system means that the polymers which comprise the components of the system are physically entangled or entwined but are not bonded to one another by chemical bonds. i.e., covalent or ionic bonds. For example, polymer blends provide solely a physical interaction between the different types of polymer chains. However, this type of physical interaction is susceptible to deterioration or degradation due to a possible leaching of one of the components of the system by action of a solvent, either aqueous or organic in nature. In contradistinction to this, the physical entanglement or entwinement of the two polymer systems cannot be affected by the action of any solvent or medium in which the membrane is used.

In addition to the water-insoluble properties which are possessed by the IPN of the present invention, another physical characteristic or property of the IPN is that the resulting membrane will exhibit high protonic conductivity at temperatures well below the observed glass transition temperatures of the individual homopolymers. Furthermore, the membranes of the present invention will possess ionic resistivities which are four to five orders of magnitude less than other polymer blends. Inasmuch as in some electronic devices such as hydrogen sensor devices, it is necessary to measure the output voltage, it will be possible when utilizing a membrane of the present invention to use a lower impedance voltage measuring device. By using such a device, it will lower the cost of the package, that is, everything that is required to measure the concentration of hydrogen, and thus provide a more attractive commercial package due to the lower cost and simplified electronic device. In addition, a device with reduced impedance is less sensitive to electromagnetic interference than a high impedance device. This permits the device to be located in an electrically noisy environment without adversely affecting its performance.

One component of the host polymer blend will comprise a phosphoric acid or sulfuric acid. Examples of phosphoric acids which may be employed will include hypophosphoric acid, pyrophosphoric acid, polyphosphoric acid, metaphosphoric acid, ortho-phosphoric acid or aqueous sulfuric acid, which may be present in an amount in the range of from about 10% to about 40% of sulfuric acid in the aqueous solution. The other component of the host polymer will comprise a polymer or copolymer of a compound which possesses repeat units, said compound being selected from a group consisting of hydroxy ethylene, ethyleneimine, acrylic acid, methacrylic acid, N-vinylimidazole, ethylene oxide, acrylamide, N-substituted acrylamides, 4-vinylpyridine, 2-vinylpyridine, vinyl sulfonic acid, 2-ethyl-2-oxazoline and phenol formaldehyde resins.

The guest polymer will be formed from a water-soluble monofunctional monomer and a difunctional cross-linking agent. In the present embodiment of the invention, the water-soluble monofunctional monomer will comprise an acrylic acid or an acrylamide such as acrylic acid, methacrylic acid, acrylamide, methacrylamide, 2-acrylamido-2-methylpropanesulfonic acid, N-benzylacrylamide, N-ethylmethacrylamide, N-phenylacrylamide, N-phenylmethacrylamide, etc. Some specific examples of difunctional cross-linking agents will comprise substituted acrylamides such as methylenebisacrylamide, N,N-divinylacrylamide, N,N-diallylacrylamide, N,N'-trimethylenebisacrylamide, m-xylenebisacrylamide, etc. It is to be understood that the aforementioned list of monofunctional water-soluble monomers and difunctional cross-linking agents are only representative of the class of compounds which may be used to prepare the guest polymer and that the present invention is not necessarily limited thereto. The monofunctional monomer which is employed to form the guest polymer differs from any of the monomeric repeat units which comprise the organic polymer in the host polymer blend so that an interpenetrating polymer network may be formed.

The water-insoluble proton-conducting polymer membrane may be prepared by any manner suitable and known in the art. For example, a solution which may be designated as the host polymer solution and which contains a mixture of the phosphoric acid or sulfuric acid and a polymer or copolymer of compounds such as hydroxy ethylene, vinyl amine or others of the type hereinbefore set forth in greater detail, dissolved in a solvent which, in the present embodiment of the invention, comprises water is admixed with a solution of guest polymer precursors comprising a mixture of a monofunctional monomer and a difunctional cross-linking agent of the type hereinbefore set forth in greater detail, the monomer and cross-linking agent being dissolved in the same solvent as was utilized to prepare the solution of the acid and polymer. The admixture of the two solutions may be effected at admixing conditions which will include a temperature in the range of from about ambient (20°-25° C.)to about 50° C. and a pressure in the range of from about ambient to about 200 pounds per square inch. Upon completion of the admixing step, the resulting solution is then cast upon a casting surface. The casting surface may comprise any support which will provide a smooth surface for the formation of the membrane such as glass, stainless steel, etc. After casting, the solvent is removed by any means as for example, in the case when water is used as a solvent, by evaporation. The evaporation may be effected at room temperature over a period of time ranging up to about 24 hours or, by subjecting the film to applied elevated temperatures up to about 400° C. and/or reduced pressure as low as 10 mm Hg.

Following evaporation of the solvent with the formation of a thin film membrane, the membrane is then cured or cross-linked by various methods also well known in the art. For example, the membrane may be cured or cross-linked by being subjected to ultraviolet irradiation or elevated temperatures ranging from about 500° to about 800° C. in the presence of an activator such as azoisobutyronitrile (AIBN) and in an inert atmosphere such as nitrogen. Alternatively, the cure of the membrane may be effected by subjecting said membrane to an irradiation from an electron beam, the membrane being treated on either one side or both sides thereof.

The ratio of reactants or components which may be present in the host polymer blend and guest polymer may vary over a relatively wide range. For example, the mol ratio of polymer or copolymer of the various compounds to the acid in the host polymer may be in a range of from about 1:1 to about 5:1 repeat units of polymers or copolymers per mol of acid. In like manner, the mol ratio of monofunctional monomers to difunctional cross-linking agent in the guest polymer may be in a mol ratio in the range of from 35.0:1.0 to 1.0:10.0 moles of monomer per mole of cross-linking agent. In like manner, the mol ratio of host polymer to guest polymer may be in a ratio of from about 5:1 to about 1:20.0 moles of host polymer to moles of guest polymer.

The following examples are given for purposes of illustrating the novel water-insoluble proton-conducting polymer membranes of the present invention, the process for preparing these polymers and to the conductivity properties of these membranes. However, it is to be understood that these examples are given merely for purposes of illustration and that the present invention is not necessarily limited thereto.

EXAMPLE I

A water-insoluble proton-conducting polymer was prepared by dissolving 0.5 grams of poly(vinyl alcohol) and 0.2 mL of 85% orthophosphoric acid in boiling deionized water for a total volume of 25 mL. Another solution was prepared by admixing two grams of methylenebisacrylamide and 30.1 grams of methacrylic acid in 25 grams of water. The two solutions in amounts of 6.7 milliliters and 10 milliliters respectively were admixed and poured into a polycarbonate Petri dish which acted as a casting surface. The aqueous solvent was allowed to evaporate and the resulting membrane film was recovered. Following this the membrane was subjected to irradiation from an electron beam using 175 kiloelectron volts (Kev) and 5 Megarads (Mrad) per pass. The resulting thin film membrane was cut into a disk having a 1 inch diameter and platinum electrodes were sputter-deposited onto both sides of the disk.

The membrane was then placed into a Teflon holder and electrical contacts were made with the electrodes through copper platens. On one side of the membrane a hydrogen pressure of one atmosphere was maintained while exposing the working electrode to a blend composed of 10% hydrogen and 90% nitrogen. After 24 hours the results of this test showed that an output EMF of 29.2 millivolts (mV) had been generated with a resistivity of $2.0 \times 10^6$ ohm-cm. This compared to an output EMF of 0.1 mV when pure hydrogen was present on both sides of the membrane.

EXAMPLE II

In this example, a membrane similar in nature to that set forth in the above example was prepared and cross-linked by subjecting both sides of the membrane to irradiation from an electron beam using 175 Kev and 5 Mrad as was used in Example 1 above, the only difference being that in Example 1 only one side of the membrane was irradiated with the electron beam. Again, electrodes comprising platinum were sputter-deposited onto both sides of the disk which was then placed in a Teflon cell and a reference gas consisting of 100% hydrogen and a working gas comprising 10% hydrogen and 90% nitrogen were placed on each side of the cell. The gases were continuously flushed through the cell and an output EMF of 29.0 mV was generated. This compared to an output EMF of 0.0 mV when pure hydrogen was present on both sides of the membrane. In addition, the resistivity of the membrane was $6.9 \times 10^5$ ohm-cm.

EXAMPLE III

In this example, an interpenetrating polymer network membrane was prepared from two solutions. The host polymer solution was obtained from an aqueous solution containing 0.50 grams of poly(vinyl alcohol) and 0.29 grams of orthophosphoric acid. Likewise, the guest polymer was obtained from an aqueous solution which contained 2.69 grams of methacrylic acid and 0.18 grams of methylenebisacrylamide. The two solutions were admixed and poured onto a casting surface comprising a polycarbonate Petri dish. After evaporation of the aqueous solvent, the thin film was crosslinked by irradiation on one side from an electron beam under conditions similar to those set forth in the above examples.

The cured membrane was then cut into 1 inch diameter disks, platinum electrodes were sputter-deposited thereon and the membrane was positioned in the middle of a Teflon cell. Testing of the membrane in a manner similar to that set forth above resulted in an output EMF of 29.4 mV and a resistivity of $5.1 \times 10^6$ ohm-cm after 24 hours.

EXAMPLE IV

In this example, the membrane was cast from an aqueous solution prepared from a host polymer containing 0.50 grams of poly(vinyl alcohol) and 0.56 grams of orthophosphoric acid and a guest polymer solution which contained 0.54 grams of methacrylic acid and 0.04 grams of methylenebisacrylamide. After evaporation of the solvent, the membrane was subjected to a cross-linking by passing the membrane on a conveyor belt through an apparatus and subjecting both sides of the membrane to irradiation with an electron beam. Again, the cross-linked membrane was cut into 1 inch diameter disks, platinum electrodes were sputter-deposited on each side thereof and the membrane was tested in a manner set forth in the above examples. After being subjected to flushing of a reference gas consisting of 100% hydrogen and a working gas consisting of 10% hydrogen and 90% nitrogen for a period of 24 hours, an output EMF of 29.2 mV was generated while the resistivity was measured at $1.9 \times 10^5$ ohm-cm.

EXAMPLE V

In this example, the host polymer solution which was used to prepare the membrane was similar in nature to that described in Example 4 above, while the guest polymer solution contained 2.69 grams of methacrylic acid and 0.18 grams of methylenebisacrylamide. After treatment of the membrane in a manner similar to that set forth above, the membrane was tested in a Teflon cell and after 48 hours it was found to have generated an output EMF of 29.3 mV while having a resistivity of $2.3 \times 10^5$ ohm-cm.

EXAMPLE VI

To illustrate the water insolubility of the membrane of the present invention, samples of these membranes along with a membrane prepared from a mixture of poly(vinyl alcohol) and orthophosphoric acid in which the poly(vinyl alcohol) and orthophosphoric acid were present in a 3.8:1 mol ratio were placed in boiling water. The poly(vinyl alcohol) orthophosphoric acid membrane dissolved after 90 seconds. In contrast to this, the membranes of the present invention had not dissolved after a period of 15 minutes was reached. It is therefore readily apparent that the novel membranes of the present invention possess an insolubility to water as well as the ability to conduct protons in an efficient manner.

We claim as our invention:

1. A water-insoluble proton-conducting membrane which consists of an interpenetrating network membrane which comprises a host polymer blend and a guest polymer, wherein the host polymer blend is comprised of (1) an acid selected from the group consisting of phosphoric acids and sulfuric acid and (2) a component selected from the group consisting of (i) a polymer selected from the group consisting of poly(vinyl alcohol) poly(ethyleneimine), poly(acrylic acid), poly(ethylene oxide), poly(2-ethyl-2-oxazoline), phenol formaldehyde resins, poly(acrylamide), poly(N-substituted acrylamide), poly(4-vinylpyridine), poly(methacrylic acid), poly(N-vinylimidazole), poly(vinyl sulfonic acid), and poly(2-vinylpyridine) and (ii) copolymers having monomer units of (i); and wherein the guest polymer is formed from (1) a monofunctional monomer selected from the group consisting of acrylic acid, methacrylic acid, acrylamide, methacrylamide, 2-acrylamido-2-methylpropanesulfonic acid, N-benzylacrylamide, N-ethylmethacrylamide, N-phenylacrylamide and N-phenylmethacrylamide and (2) a difunctional cross-linking agent selected from the group consisting of methylenebisacrylamide, N,N-diallylacrylamide, m-xylenebisacrylamide and N,N'-trimethylenebisacrylamide, with the proviso that the monofunctional monomer which is employed to form the guest polymer differs from any of the monomeric repeat units which comprise the organic polymer in the host polymer blend, the mol ratio of host polymer to guest polymer ranging from about 5:1 to about 1:20, the mol ratio of repeat units of said polymer or copolymer to said acid in said host polymer ranging from about 1:1 to about 5:1 and the mol ratio of monofunctional monomer to difunctional cross-linking agent in said guest polymer ranging from about 35:1 to about 1:10.

2. The membrane as set forth in claim 1 in which said phosphoric acid is orthophosphoric acid.

3. The membrane as set forth in claim 1 in which said phosphoric acid is polyphosphoric acid.

4. The membrane as set forth in claim 1 in which said monofunctional monomer is selected from the group consisting of acrylic acid, methacrylic acid and an acrylamide.

5. The membrane as set forth in claim 4 in which said monofunctional is acrylic acid.

6. The membrane as set forth in claim 4 in which said monofunctional monomer is methacrylic acid.

7. The membrane as set forth in claim 4 in which said monofunctional monomer is acrylamide.

8. The membrane as set forth in claim 1 in which said difunctional cross-linking agent comprises a substituted acrylamide.

9. The membrane as set forth in claim 8 in which said substituted acrylamide is methylenebisacrylamide.

10. The membrane as set forth in claim 8 in which said substituted acrylamide is N,N-diallylacrylamide.

11. The membrane as set forth in claim 8 in which said substituted acrylamide is m-xylenebisacrylamide.

12. The membrane as set forth in claim 1 in which said interpenetrating polymer network comprises a host polymer blend consisting of poly(vinyl alcohol) and orthophosphoric acid and a guest polymer consisting of poly(methacrylic acid-methylenebisacrylamide).

13. The membrane as set forth in claim 1, in which said interpenetrating polymer network comprises a host polymer blend consisting of poly(vinyl alcohol) and orthophosphoric acid and a guest polymer consisting of poly(acrylic acid-methylenebisacrylamide).

14. The membrane as set forth in claim 1 in which said interpenetrating polymer network comprises a host polymer blend consisting of poly(acrylic acid ) and orthophosphoric acid and a guest polymer consisting of poly(methacrylic acid-N,N-diallylacrylamide).

15. The membrane as set forth in claim 1 in which said interpenetrating polymer network comprises a host polymer blend consisting of poly(vinyl alcohol) and sulfuric acid and a guest polymer consisting of poly(acrylamidemethylenebisacrylamide).

16. The membrane as set forth in claim 1 in which said interpenetrating polymer network comprises a host polymer blend consisting of poly(vinyl alcohol) and sulfuric acid and a host polymer consisting of poly(methacrylic acid-methylenebisacrylamide).

17. A process for the preparation of a water-insoluble proton-conducting interpenetrating polymer network membrane which consists of admixing at admixing conditions a solution of a host polymer blend comprised of (1) an acid selected from the group consisting of phosphoric acids and sulfurinc acid and (2) a component selected from the group consisting of (i) a polymer selected from the group consisting of poly(vinyl alcohol) poly(ethyleneimine), poly(acrylic acid), poly(ethylene oxide), poly(2-ethyl-2-oxazoline), phenol formaldehyde resins, poly(acrylamide), poly(N-substituted acrylamide), poly(4-vinylpyridine), poly(methacrylic acid), poly(N-vinylimidazole), poly(vinyl sulfonic acid), and poly(2-vinylpyridine) and (ii) copolymers having monomer units of (i) with a solution of a guest polymer formed from (1) a monofucntional monomer selected from the group consisting of acrylic acid, methacrylic acid, acrylamide, methacrylamide, 2-acrylamido-2-methylpropanesulfonic acid, N-benzylacrylamide, N-ethylmethacrylamide, N-phenylacrylamide and N-phenyl-methacrylamide and (2) a difunctional cross-linking agent selected from the group consisting of methylenebisacrylamide, N,N-diallylacrylamide, m-xylenebisacrylamide and N,N'-trimethylenebisacrylamide, with the proviso that the monofunctional monomer which is employed to form the guest polymer differs from any of the monomeric repeat units which comprises the organic polymer in the host polymer blend, casting the admixture on a casting surface, removing the solvent, curing the resultant membrane, and recovering the resultant water-insoluble proton-conducting interpenetrating polymer network membrane, the mol ratio of host polymer to guest polymer ranging from about 5:1 to about 1:20, the mol ratio of repeat units of said polymer or copolymer to said acid in said host polymer ranging from about 1:1 to about 5:1 and the mol ratio of monofunctional monomer to difunctional cross-linking agent in said guest polymer ranging from about 35:1 to about 1:10.

18. The process as set forth in claim 17 in which said solutions of host polymer and guest polymer are aqueous in nature.

19. The process as set forth in claim 17 in which the removal of said solvent is effected by means of evaporation.

20. The process as set forth in claim 17 in which said curing is effected by exposure of said membrane to an electron beam.

21. The process as set forth in claim 17 in which said curing is effected by exposure of said membrane to an elevated temperature in an inert atmosphere.

22. The process as set forth in claim 17 in which said admixing conditions include a temperature in the range of from about ambient to about 50° C. and a pressure in the range of from about ambient to about 200 pounds per square inch.

23. The process as set forth in claim 17 in which said host polymer consists of poly(vinyl alcohol) and orthophosphoric acid and said guest polymer consists of poly(methacrylic acid-methylenebisacrylamide).

24. The process as set forth in claim 17 in which said host polymer blend consists of poly(vinyl alcohol) and orthophosphoric acid and said guest polymer consists of poly(acrylic acid-methylenebisacrylamide).

25. The process as set forth in claim 17 in which said host polymer blend consists of poly(acrylic acid) and orthophosphoric acid and said guest polymer consists of poly(methacrylic acid-N,N-diallylacrylamide).

26. The process as set forth in claim 17 in which said host polymer blend consists of poly(vinyl alcohol) and sulfuric acid and said guest polymer consists of poly(acrylamide-methylenebisacrylamide).

27. The process as set forth in claim 17 in which said host polymer blend consists of poly(vinyl alcohol) and sulfuric acid and said guest polymer consists of poly(methacrylic acid-methylenebisacrylamide).

* * * * *

UNITED STATES PATENT AND TRADEMARK OFFICE
CERTIFICATE OF CORRECTION

PATENT NO. : 4,708,981

DATED : November 24, 1987

INVENTOR(S) : Zupancic et al.

It is certified that error appears in the above-identified patent and that said Letters Patent is hereby corrected as shown below:

In Column 9, line 20: Before "network", insert --polymer--.

Signed and Sealed this

Twelfth Day of April, 1988

Attest:

DONALD J. QUIGG

Attesting Officer

Commissioner of Patents and Trademarks